US012798944B2

(12) United States Patent
Pawar

(10) Patent No.: US 12,798,944 B2
(45) Date of Patent: Nov. 17, 2026

(54) SYSTEM AND METHOD FOR GRAPPLE HYDRAULICS REGULATION BASED ON WORK VEHICLE FUNCTIONS

(71) Applicant: Deere & Company, Moline, IL (US)

(72) Inventor: Sanket Pawar, Pune (IN)

(73) Assignee: Deere & Company, Moline, IL (US)

( * ) Notice: Subject to any disclaimer, the term of this patent is extended or adjusted under 35 U.S.C. 154(b) by 944 days.

(21) Appl. No.: 17/734,264

(22) Filed: May 2, 2022

(65) Prior Publication Data

US 2023/0348250 A1 Nov. 2, 2023

(51) Int. Cl.
*B66F 9/065* (2006.01)
*B66F 9/22* (2006.01)

(52) U.S. Cl.
CPC ................ *B66F 9/22* (2013.01); *B66F 9/065* (2013.01)

(58) Field of Classification Search
CPC .................................. B66F 9/22; B66F 9/065
See application file for complete search history.

(56) References Cited

U.S. PATENT DOCUMENTS

| | | | | |
|---|---|---|---|---|
| 4,431,365 | A | 2/1984 | Sturtz, Jr. | |
| 5,558,380 | A | 9/1996 | Meyer et al. | |
| 9,297,148 | B2 | 3/2016 | Stulen et al. | |
| 9,618,941 | B2 | 4/2017 | Palmroth et al. | |
| 10,030,678 | B2 | 7/2018 | Stahle et al. | |
| 10,066,644 | B2 | 9/2018 | Opdenbosch | |
| 10,624,279 | B1 * | 4/2020 | Mead | A01G 23/093 |
| 11,004,279 | B2 | 5/2021 | Flood et al. | |
| 2014/0271079 | A1 | 9/2014 | Fichtinger et al. | |
| 2015/0023771 | A1 | 1/2015 | Carr et al. | |
| 2019/0331481 | A1 | 10/2019 | Flood et al. | |
| 2020/0002973 | A1 | 1/2020 | Hill | |
| 2020/0364952 | A1 * | 11/2020 | Sano | G07C 5/008 |
| 2021/0253081 | A1 * | 8/2021 | Duffy | B60L 58/12 |

FOREIGN PATENT DOCUMENTS

| | | | |
|---|---|---|---|
| JP | 2006300146 | A | 11/2006 |
| JP | 2011102633 | A | 5/2011 |

OTHER PUBLICATIONS

German Search Report issued in application No. 102023106048.1 dated Feb. 28, 2024, 08 pages.

* cited by examiner

*Primary Examiner* — Adnan M Mirza
(74) *Attorney, Agent, or Firm* — Gary L. Montle; Nathan I. North; Patterson Intellectual Property Law, PC

(57) ABSTRACT

A computer-implemented method is provided for controlling a work tool coupled to a frame of a work vehicle and moveable relative thereto, wherein the work tool is configured in a first mode to apply an enclosing pressure on a load and in a second mode to release the enclosing pressure on the load. At least one work state of the work vehicle is determined. In association with the first mode, which may for example be user-selectable or otherwise determined in view of the work state, a configuration setting corresponding to the at least one work state of the work vehicle is automatically selected from data storage, and a control signal is generated for controlling an actuator associated with an amount of enclosing pressure applied by the work tool and upon the load, based at least in part on the selected configuration setting.

18 Claims, 5 Drawing Sheets

SYSTEM AND METHOD FOR GRAPPLE HYDRAULICS REGULATION BASED ON WORK VEHICLE FUNCTIONS

FIELD OF THE DISCLOSURE

The present disclosure relates generally to work vehicles utilizing grappling work tools, and more particularly to systems and methods for regulating a grapple hydraulics pressure for such work tools based on functions and/or operations of such work vehicles.

BACKGROUND

Work vehicles of this type may for example include knuckleboom loaders, tracked feller bunchers, swing machine log loaders, forwarders, construction excavators, backhoes, and the like. These machines may typically have a wheeled and/or tracked ground engaging mechanism supporting the undercarriage from the ground surface, and an assembly including a work tool at a distal end thereof such as a grapple which encloses/opens to grip/release items such as logs. In the forestry industry, as one example, grapple skidders may be used to transport harvested standing trees from one location to another, typically from a harvesting site to a processing site.

In certain such work vehicles, multiple booms may be arranged in a boom assembly wherein controlled movement of the implement may be relatively difficult, requiring significant investment in operator training. This can be especially difficult to maneuver with the variable payloads and physical limitations of the actuators. Under conventional control systems, for example, an operator may move a joystick along one axis to move one more actuators that pivot a first boom section, and move the joystick along another axis to move actuators that pivot a second boom section. While performing corresponding log handling operations (e.g., raise, lower, rotate, machine swing, delimbing, etc.), a grapple close function is also commanded in order to improve the grip with respect to logs being handled by the work tool, or in other words to prevent logs from slipping off the grapple. These operations typically do not require a maximum available amount of tong/claw pressure at any given time.

Nonetheless, grapple hydraulic flow rates are conventionally designed to deliver a maximum possible pressure while handing logs. On/Off type push button controls (operator choice) on user interface tool such as a joystick in the operator cab typically command the respective pump to operate at maximum pressure, regardless of actual need. This results into higher fuel consumption, in addition to the detrimental effects of small size logs often becoming cracked or snapped due to access tong pressure during rotate or grapple close operations.

Statistically speaking, the grapple close function is active along with other work vehicle functions for more than forty percent of an operational time. It has been determined in the context of an invention as disclosed herein to be possible to reduce pump command by about thirty to fifty-five percent, depending on the function being commanded other than the grapple close function.

It would accordingly be desirable to automatically control grapple squeeze flow rates (e.g., tong/claw pressure) in conjunction with selected machine functions, for example, based on the type of work being performed and/or detected work conditions or parameters. Such innovations may for example improve fuel efficiency, improve the projected life of components such as pumps, ensure safety by for example preventing accidental slippage of logs from within the grapple enclosure, and/or limit potential damage to logs from being cracked or snapped by excess squeeze pressure.

BRIEF SUMMARY

The current disclosure provides an enhancement to conventional systems, at least in part by introducing a novel system and method for automatically controlling grapple squeeze flow rates (tong/claw pressure) with respect to determined machine functions. Rather than attempting to manually monitor and regulate the various components during operation, an operator can preset different flow rates for, e.g., grapple open/close functions with respect to other machine functions such as grapple rotate, machine swing, boom raise/lower, delimbing, and the like.

According to an embodiment, a method is disclosed herein for controlling a work tool coupled to a frame of a work vehicle and moveable relative thereto, wherein the work tool is configured in a first mode to apply an enclosing pressure on a load and in a second mode to release the enclosing pressure on the load. At least one work state of the work vehicle is determined. In association with the first mode, a configuration setting corresponding to the at least one work state of the work vehicle is automatically selected from data storage. A control signal is generated for controlling an actuator associated with an amount of enclosing pressure applied by the work tool and upon the load, based at least in part on the selected configuration setting.

In a second embodiment, an exemplary further aspect according to the above-referenced first embodiment may include that the configuration setting is a hydraulic configuration setting, and the control signal is generated to the actuator for controlling a hydraulic flow rate and thereby the amount of enclosing pressure applied by the work tool and upon the load, based at least in part on the selected hydraulic configuration setting.

In a third embodiment, an exemplary further aspect according to the above-referenced second embodiment may include that the data storage comprises a plurality of selectable hydraulic configuration settings which are predetermined based on user input corresponding to respective work states. An exemplary further aspect according to the above-referenced second embodiment may include that the plurality of selectable hydraulic configuration settings are automatically adjusted based on historical data correlating hydraulic flow rates and failure conditions for the respective work states.

In a fourth embodiment, an exemplary further aspect according to any of the above-referenced first to third embodiments may include that the at least one work state of the work vehicle is determined based at least in part on user commands and/or respective input signals from one or more onboard sensors.

The at least one work state of the work vehicle may for example be determined based on a first user command selecting the first mode and at least a second user command specifying further operations of the work vehicle.

The input signals from at least one of the one or more onboard sensors may for example be representative of one or more work vehicle functions comprising: a raising/lowering movement of a boom assembly coupled to the work tool; a swinging movement of the boom assembly coupled to the work tool; a swinging movement of the work vehicle; a delimber function; an enclosing pressure applied by the work tool; and a saw function.

The user commands may for example be received via at least one of the one or more onboard sensors, and/or via a user interface associated with an onboard computing device.

In a fifth embodiment, an exemplary further aspect according to any of the above-referenced first to fourth embodiments may include that a baseline maximum hydraulic flow rate is predetermined, and wherein the control signal is generated for controlling a hydraulic flow rate and thereby an amount of enclosing pressure applied by the work tool and upon the load, based on the selected hydraulic configuration setting as a proportion of the baseline maximum hydraulic flow rate.

In a sixth embodiment, an exemplary further aspect according to any of the above-referenced first to fifth embodiments may include that a baseline maximum hydraulic flow rate is set according to user manipulation of an interface tool during the first mode, and wherein the control signal is generated for controlling a hydraulic flow rate and thereby an amount of enclosing pressure applied by the work tool and upon the load, based on the selected hydraulic configuration setting as a proportion of the baseline maximum hydraulic flow rate.

In a seventh embodiment, a work vehicle as disclosed herein comprises: a frame; a work tool coupled to the frame and moveable relative thereto, wherein the work tool is configured in a user-selectable first mode to apply an enclosing pressure on a load and in a user-selectable second mode to release the enclosing pressure on the load; an onboard user interface configured to receive user input corresponding to respective user commands; and a controller configured in association with the user-selectable first mode to direct the performance of steps in a method according to any one or more of the first to sixth embodiments.

Numerous objects, features and advantages of the embodiments set forth herein will be readily apparent to those skilled in the art upon reading of the following disclosure when taken in conjunction with the accompanying drawings.

DETAILED DESCRIPTION

Figure 1:
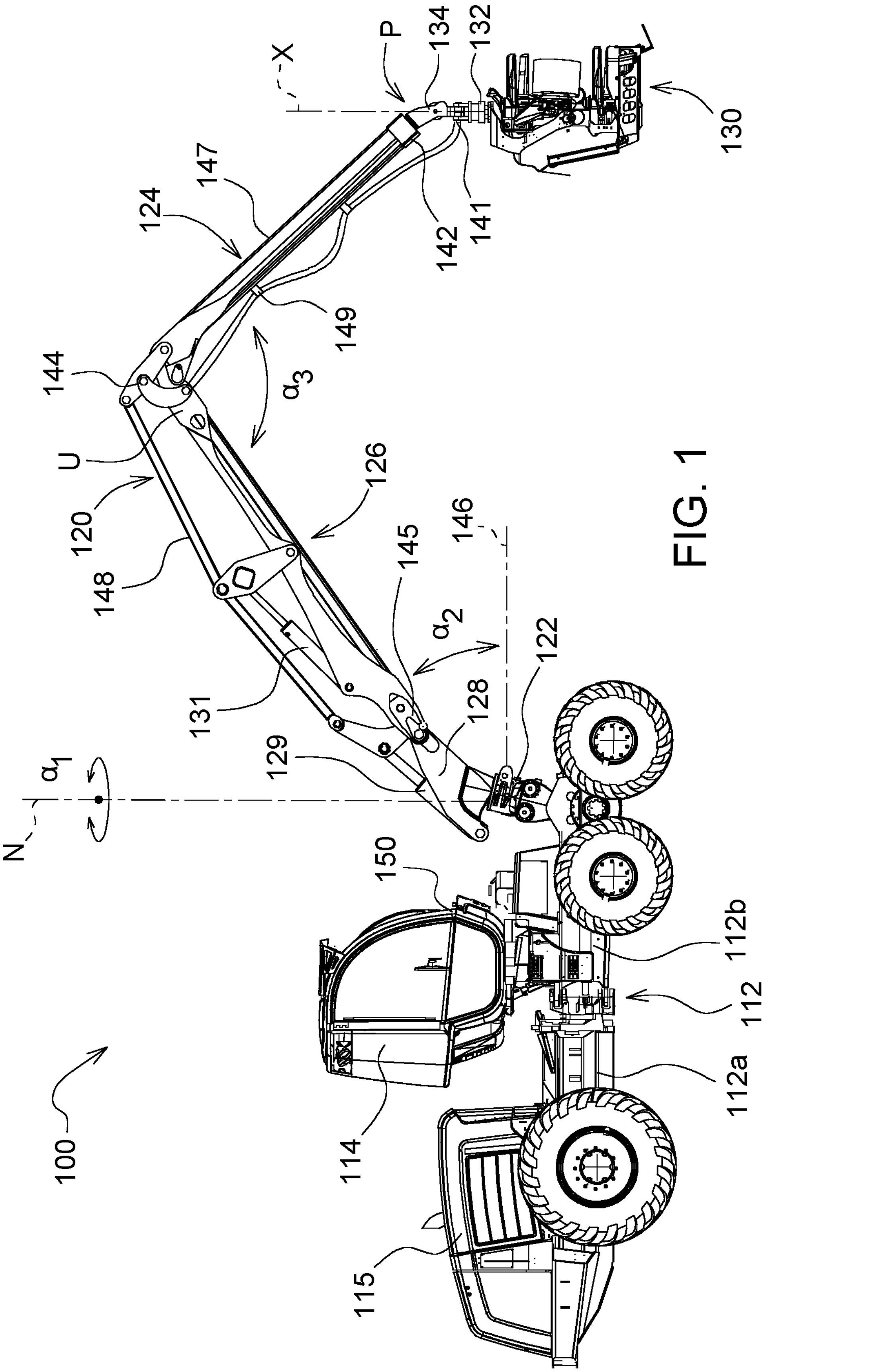
FIG. 1 is a side view representing an exemplary work vehicle according to the present disclosure.

FIG. 1 in a particular embodiment as disclosed herein shows a representative work vehicle in the form of, for example, a harvester 100. The work vehicle 100 comprises a frame 112, an operator cab 114, an engine 115 as the source of power and an articulated boom 120 on the frame 112. The frame 112 may be articulated and have two or more frame sections 112*a*, 112*b* connected one after the other by means of a controlled joint. The frame 12 is wheeled and supported by several ground engaging units, which as represented are wheels but may for example be tracks in the context of other equivalent work vehicles 100 within the scope of the present disclosure.

The boom 120 is mounted onto a slewing apparatus 122 connected to the frame 112. By turning the slewing apparatus 122, the boom 120 can be rotated about an axis N that is parallel to the surface normal of the plane on which the work machine 100 stands or moves. The axis N is oriented vertically or substantially vertically. In an example of the solution, the boom 120 with the slewing apparatus 122 may further be mounted on a tilting apparatus connected to the frame 112 for tilting the boom 120 such that the axis N is controllably tilted.

The boom 120 may have two or more boom sections connected one after the other. Two or more boom sections are connected to each other by means of joint arrangements controlled by means of one or several actuators, e.g., a cylinder actuator.

In the example of FIG. 1, the boom 120 has a base section 128 connected between the slewing apparatus 122 and a second boom section 126. The orientation of the second boom section 126 in relation to the base section 128 is controlled by a cylinder actuator 129. The cylinder actuator 129 is connected between the base section 128 and the second boom section 126. Alternatively, the second boom section 126 is connected to the slewing apparatus 122 without a base section and the cylinder actuator 129 is connected between the second boom section 126 and, e.g., the slewing apparatus 122. A first boom section 124 is connected to the second boom section 126. The orientation of the first boom section 124 in relation to the second boom section 126 is controlled by a cylinder actuator 131. The cylinder actuator 131 is connected between the second boom section 126 and, either directly or via a joint arrangement, the first boom section 124.

One or more boom sections of the boom 120 may operate telescopically. The extension and the length of the telescopically operating boom section is controlled by means of two or more boom section parts arranged movably within each other. One or several actuators, e.g., cylinder actuators, may be used to control the relative positions of the boom section parts. The cylinder actuator is connected to the boom section with boom section parts and the cylinder is located either inside or outside the boom section. A tool may be connected to the tip of the boom section part representing the tip of the boom 120.

In the illustrated example, the tool 130 is connected to the boom 120. Preferably, the tool is connected at the end of the boom 120 or the first boom section 124 and represented by the tip P of the boom 120. The tool 130 is rotatably connected to the tip P of the boom 120 by means of an actuator 132, e.g., a rotator. With the actuator 132, the tool 130 suspended to the actuator 132 can be controllably rotated about a rotation axis X that is typically oriented vertically or substantially vertically. The orientation of the tool 130 is thus controlled with the actuator 132.

The actuator 132 may be connected to the tip P via a link 134. The link 134 provides free orientation of the actuator 132 and the tool 130 with respect to the boom 120 such that the rotation axis X and the actuator 132, and the tool 130 connected to the actuator 132, are able to maintain their upright, vertical position.

The tool 130 may be a harvester head, a felling head, a harvesting and processing head, a harvester head suitable to be used as a log grapple, a log grapple, or other equivalents as may be understood by one of skill in the art. The tool 130, grabbing a standing tree from a side, needs to be oriented, e.g., towards the tree standing vertically. A predetermined side of the tool 130 faces the standing tree. According to an example, the tool 130 is a harvester head for harvesting and processing trees by grabbing, felling, delimbing, and cutting. As another example, wherein for example the work vehicle 100 is a construction excavator for road building, etc., the tool 130 may include a bucket and a hydraulic thumb rotating on a common pivot point for reciprocal engagement of logs and the like.

Particularly in the context of a grapple as discussed elsewhere herein, the tool 130 may include a base and a pair of (e.g., left and right) tongs controllable at proximal ends by a corresponding pair of (e.g., left and right) hydraulic cylinders to open and close the grapple. The left hydraulic cylinder may have a head end coupled to the base, and a piston end coupled to the proximal end of the left tong. The right hydraulic cylinder may have a head end coupled to the base, and a piston end coupled to the proximal end of the right tong. The operator can control extension and retraction of the left and right hydraulic cylinders to open and close the grapple. When the left and right hydraulic cylinders are retracted, the proximal ends of the left and right tongs are brought closer together, which pulls apart the distal ends of the left and right tongs and opens the grapple. When the left and right hydraulic cylinders are extended, the proximal ends of the left and right tongs are pushed apart, which brings together the distal ends of the left and right tongs and closes the grapple. The operator can retract the left and right tongs to open the grapple to surround a payload (e.g., trees or other woody vegetation), and then extend the left and right tong cylinders to close the grapple to grab, hold and lift the payload so the work vehicle can move it to another desired location.

The tool 130 may further have tilting devices for changing the orientation of the tool 130 or the tongs (arms) from a horizontal direction to a vertical direction and vice versa. Thus, a harvester head can grab logs or tree trunks lying horizontally and a log grapple can grab logs or tree trunks standing vertically.

One or more boom sections of the boom 120 operate by raising and lowering a tool or another boom section connected to the boom section. The raising and lowering takes place on a vertical or substantially vertical plane. The second boom section 126 may be pivotably connected to the base section 128. In this way, the height of the end U of the second boom section 126 can be controlled by turning the second boom section 126 about an axis that is perpendicular or transversal to the axis N, thus horizontal or substantially horizontal during operation of the work vehicle 100. The second boom section 126 is pivotably connected to the first boom section 124. In this way, the height of the tip P of the first boom section 124 and the boom 120 can be controlled by turning the first boom section 124 about an axis that is perpendicular or transversal to the axis N.

Figure 2:
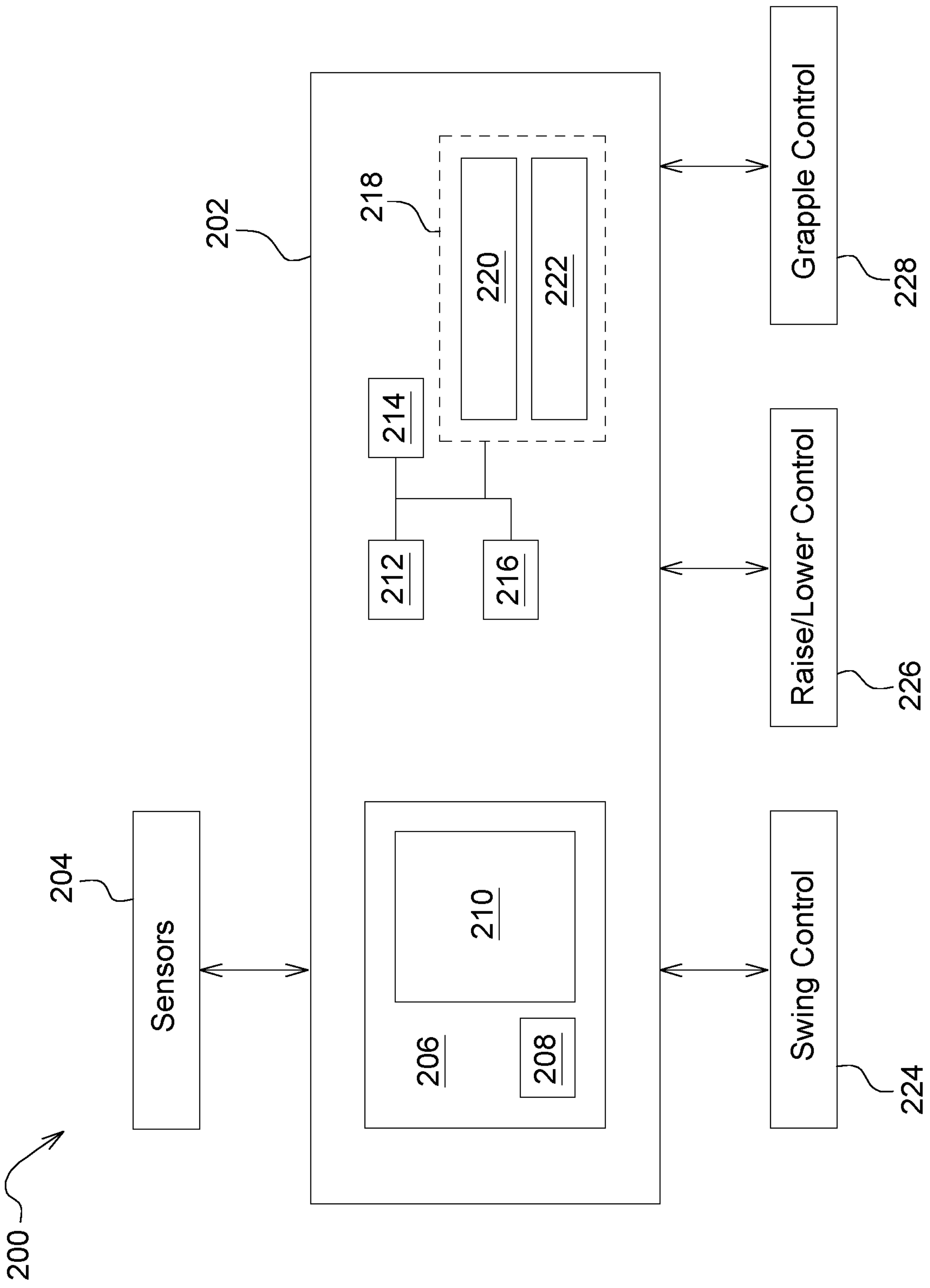
FIG. 2 is a block diagram representing an exemplary control system according to an embodiment of the present disclosure.

As schematically illustrated in FIG. 2, the work vehicle 100 includes a control system 200 including a controller 202. The controller 202 may be part of the vehicle control unit, or it may be a separate control module. The controller 202 may include a user interface 206 and optionally be mounted in the operator cab 114 at a control panel 150.

The user interface 206 may include or otherwise be linked to one or more control devices 208, such as for example joysticks, located for example at the operator cab 114 may be used by an operator to move the boom 120, the tip P of the boom or the tool 130 towards a target location. The control devices 208 may be operably connected with the controller 202 of the work vehicle 100. A display 210 may be connected to the controller 202 for showing information and data to the operator.

The controller 202 may be configured to generate control signals for controlling the operation of respective actuators, or signals for indirect control via intermediate control units, associated with a swing control 224, an implement raise/lower control 226, a grapple control 228, and/or the like. The term "grapple control" as used herein may generally refer to control functions with respect to grappling tools (including for example hydraulic thumbs in combination with buckets as used on excavators, backhoes and the like) and are not limited to a particular form of grapple. The controller 202 may for example be electrically coupled to respective components of these and/or other units by a wiring harness such that messages, commands, and electrical power may be transmitted between the controller 202 and the remainder of the work vehicle 100. The controller 202 may be coupled to other controllers, such as for example the engine control unit (ECU), through a controller area network (CAN), and may then send and receive messages over the CAN to communicate with other components of the CAN.

The actuators may be motors or cylinder actuators utilizing hydraulic energy and pressurized medium which is transmitted to the actuator by means of, e.g., lines and flexible hoses. An apparatus needed for generating the hydraulic energy is placed in, e.g., the frame 112 or is operatively connected to the engine 115. Hydraulic energy is distributed, e.g., in the form of pressurized medium to the actuators via a control circuit presenting necessary valves and components for controlling the flow of the pressurized medium. Some actuators may utilize electric energy stored in an accumulator or generated with a generator operatively connected to the engine 115. The control circuit is controlled based on control signals from the controller 202 under the control of the operator or the automatic control of the controller 202.

The controller 202 may include or be associated with a processor 212, a computer readable medium 214, a communication unit 216, data storage 218 such as for example a database network, and the aforementioned user interface 206 or control panel 150 having a display 210. It is understood that the controller described herein may be a single controller having all of the described functionality, or it may include multiple controllers wherein the described functionality is distributed among the multiple controllers.

Various operations, steps or algorithms as described in connection with the controller 202 can be embodied directly in hardware, in a computer program product such as a software module executed by the processor 212, or in a combination of the two. The computer program product can reside in RAM memory, flash memory, ROM memory, EPROM memory, EEPROM memory, registers, hard disk, a removable disk, or any other form of computer-readable medium 214 known in the art. An exemplary computer-readable medium can be coupled to the processor such that the processor can read information from, and write information to, the memory/storage medium. In the alternative, the medium can be integral to the processor.

The term "processor" 212 as used herein may refer to at least general-purpose or specific-purpose processing devices and/or logic as may be understood by one of skill in the art, including but not limited to a microprocessor, a microcontroller, a state machine, and the like. A processor can also be implemented as a combination of computing devices, e.g., a combination of a DSP and a microprocessor, a plurality of microprocessors, one or more microprocessors in conjunction with a DSP core, or any other such configuration.

The communication unit 216 may support or provide communications between the controller and external systems or devices, and/or support or provide communication interface with respect to internal components of the work vehicle. The communications unit may include wireless communication system components (e.g., via cellular modem, WiFi, Bluetooth or the like) and/or may include one or more wired communications terminals such as universal serial bus ports.

The controller 202 may be configured to receive input signals from some or all of various sensors collectively defining a sensor system 204. Various sensors on the sensor system 204 may typically be discrete in nature, but signals representative of more than one input parameter may be provided from the same sensor, and the sensor system 204 may further refer to signals provided from the machine control system.

Input signals from sensors in such a sensor system 204 may for example be representative of one or more work vehicle functions comprising: a raising/lowering movement of a boom assembly coupled to the work tool; a swinging movement of the boom assembly coupled to the work tool; a swinging movement of the work vehicle; a delimber function; an enclosing pressure applied by the work tool; a saw function; and the like.

The sensor system 204 may generate signals indicative of stem length, stem diameter, stem weight, load weight, acceleration, hydraulic actuator movement or position, a geographic location (e.g., where the sensors 204 include a global positioning system (GPS) receiver or other positioning system), among others.

The sensor system 204 can include any from among orientation sensors (indicated for example in FIG. 1 as 141), acceleration sensors (indicated in FIG. 1 for example as 142) for measuring the acceleration of, e.g., the tip P of the boom, a position sensor for measuring the location of e.g. the tip P of the boom 120, an angular sensor (indicated in FIG. 1 for example as 144) for measuring the angle $\alpha 3$ between the boom sections 124, 126, an angular sensor (indicated in FIG. 1 for example as 145) for measuring the altitude angle $\alpha 2$ of the boom section about a horizontal direction, an angular sensor (indicated in FIG. 1 for example as 146) for measuring angles related to the slewing apparatus 122 or the azimuth angle $\alpha 1$ of the boom 120 about a vertical direction, e.g. the axis N, a length sensor (indicated in FIG. 1 for example as 147) for measuring the length of a telescopic boom section, a length sensor for measuring the length of a boom section, an acceleration sensor (indicated in FIG. 1 for example as 148) for measuring the angle of a boom about a horizontal direction and an angle sensor for measuring angles related to the tilting apparatus, as well as imaging sensors, such as video cameras, laser, LIDAR, radar, and a wide variety of other imaging systems.

The above referenced examples of sensors in a sensor system 204 are intended illustrative but without limiting the scope of embodiments disclosed herein unless otherwise specifically noted.

The data storage 218 in an embodiment may be configured to at least receive and store real-time and/or historical data sets regarding work vehicle parameters and/or inputs from sensors 204 in selectively retrievable form, for example as inputs for developing models 220 as further described herein for deriving and further storing hydraulic configuration settings 222 corresponding to the at least one work state of the work vehicle 100. Such hydraulic configuration settings may be initially derived and automatically adjusted over time based on aggregated data sets including newly collected and historical data for correlating hydraulic flow rates and failure conditions for the respective work states. Some or all hydraulic configuration settings in some embodiments may be predetermined or initially derived based on user input corresponding to respective work states. Data storage 218 as discussed herein may, unless otherwise stated, generally encompass hardware such as volatile or non-volatile storage devices, drives, memory, or other storage media, as well as one or more databases residing thereon.

Figure 3:
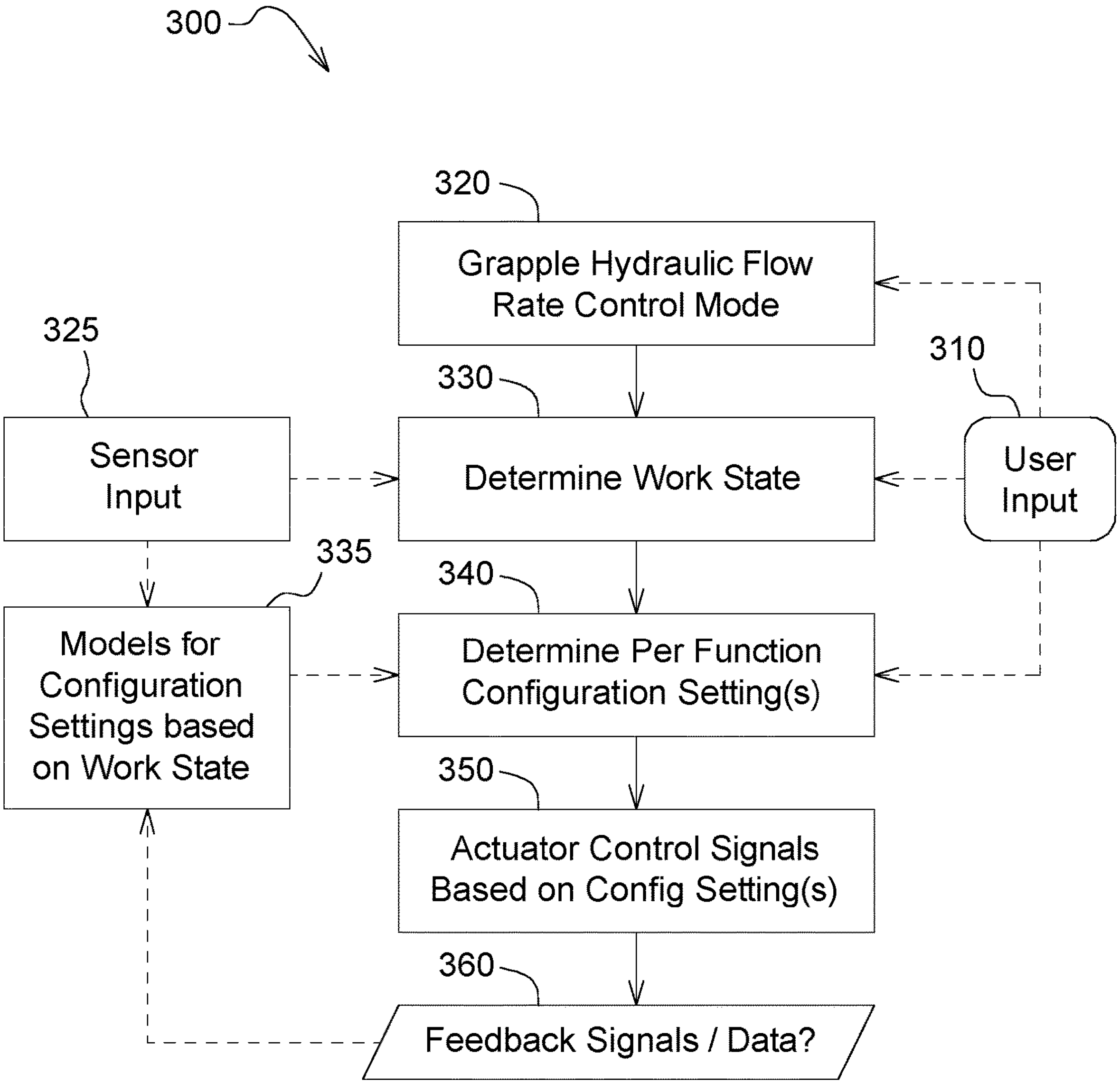
FIG. 3 is a flowchart representing an exemplary method according to an embodiment of the present disclosure.

Referring next to FIG. 3, an exemplary embodiment of a high-level method 300 of operation may now be described, as further illustrated by more particular examples as disclosed herein and with reference to FIGS. 4 and 5.

Systems and methods as disclosed herein may include enabling user selection from among a plurality of control modes, for example grapple hydraulic flow rate control modes. The user interface 206 may be configured for enabling one or more of the automated control functions as disclosed herein via a switch, button, or equivalent on/off actuator. The user interface 206 may include individual function command buttons which may be implemented in association with a 'grapple close' button to execute a respective control mode. The user interface may include a particular button, such as for example a multiplexing button, in combination with an on/off toggle command to execute a respective control mode. The user interface 206 may be configured for enabling the operator to override automated control functions, or alternatively such an override may be implemented by the operator simply carrying out the functions manually according to conventional techniques, such as for example manual commands using the relevant joysticks.

Briefly stated, in association with an exemplary user-selectable mode (block 320), at least one work state of the work vehicle may be determined (block 330), wherein a hydraulic configuration setting 222 corresponding to the at least one work state of the work vehicle 100 is automatically selected (block 340) from data storage 218. The order of the blocks is intended as illustrative and not necessarily limiting, as for example the control mode may be automatically implemented based on detected conditions rather than user-selected, the control mode may be determined at least in part on the at least one work state, the configuration setting may be other than a hydraulic configuration setting, etc. A work state as discussed herein may be specifically defined in some embodiments by operator selections, or may be dynamically determined in some embodiments based on a combination of operator selections, sensed real-time variables, programmed workflow sequences, etc. A control signal is generated (block 350) for controlling a hydraulic flow rate and thereby an amount of enclosing pressure applied by the work tool and upon the load, for example as a determined percentage relative to a maximum hydraulic capacity of one or more work tool functions, based at least in part on the selected hydraulic configuration setting 222. An enclosing pressure in this context may for example refer to a reciprocal pressure applied by either or both of two arms or tongs of a grapple with respect to each other, a pressure applied by a hydraulic thumb with respect to a bucket, or the like.

As noted elsewhere herein, in some embodiments the hydraulic configurations settings 222 may be automatically selected from data storage 218 based on input 335 from models which have been developed for this purpose, based for example and in part on input 325 from sensors 204, input 310 from the user interface 206, and the like, and in some embodiments further based on feedback signals and/or data (block 360) relating to detected results from the applied hydraulic pressure for a given work state and/or load.

Although hydraulic pressures and flow rates are referenced for illustrative purposes throughout in the context of the work state-based grapple pressure control, the scope of the present disclosure is not limited to hydraulics unless otherwise specifically noted, and in various embodiments other forms of actuators may be interchangeable with a hydraulic actuator, such as for example electric, pneumatic, electromechanical, and/or other equivalent components as may be implemented by one of skill in the art.

In an embodiment, the user interface 206 may be configured with proportional thumb wheel switches or an equivalent on the interface tools (e.g., joystick 208) instead of auto on/off switches to manually control the grapple pressure, or as an optional alternative thereto.

Figure 4:
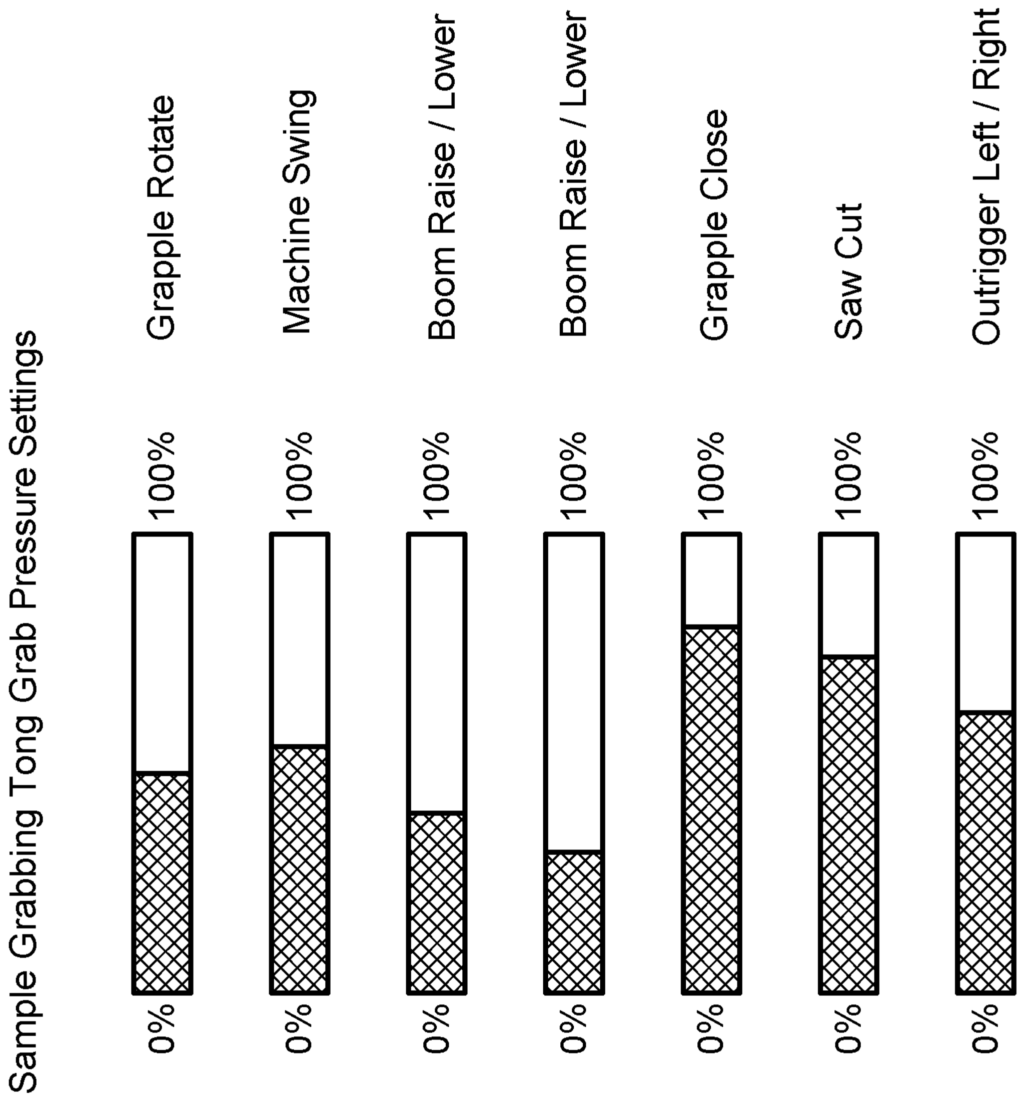
FIG. 4 is a graphical diagram representing exemplary grab pressure settings for a work tool according to an embodiment of the present disclosure.

As represented via exemplary values in FIG. 4, grapple squeeze pressure settings may be established as hydraulic configuration settings for each of a plurality of work vehicle component functions. In the example shown, the settings may be as a percentage of a maximum possible or allowable grapple flow rate for a particular function. In an embodiment, a baseline maximum hydraulic flow rate may be predetermined in association for example with a grapple close function, wherein control signals may be generated for controlling a hydraulic flow rate and thereby an amount of enclosing pressure applied by the grapple upon an associated load, based on the selected hydraulic configuration setting (e.g., associated with the relevant component function) as a proportion of the baseline maximum hydraulic flow rate.

Figure 5:
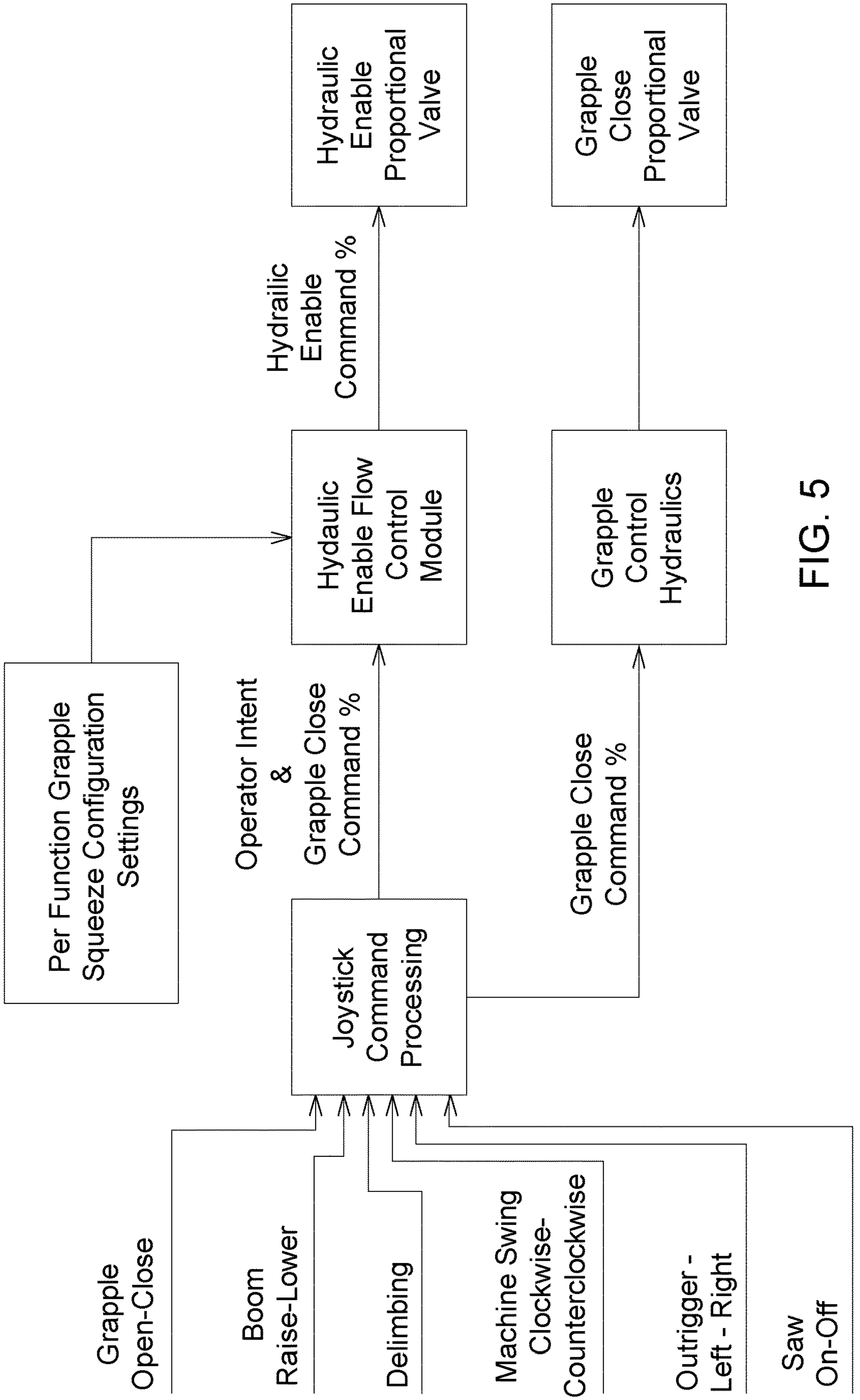
FIG. 5 is a flowchart representing an exemplary implementation of the method according to FIG. 3.

In an embodiment as represented in FIG. 5, commands received via the user interface 206 (e.g., via joysticks 208) may provide, be associated with, or otherwise be used to ascertain a grapple close command (e.g., in the form of a percentage as noted above) and an operator intent with respect to the one or more corresponding component functions. The grapple close command may be implemented in a first control branch with respect to a grapple control hydraulics module, wherein appropriate control signals are generated to a first (e.g., 'grapple close') proportional valve. The grapple close command and the operator intent may be implemented in a second control branch, further in view of hydraulic configuration settings as may for example be retrieved from data storage based at least in part on the grapple close command and/or the operator intent, with respect to a hydraulic flow control module which further generates appropriate control signals (e.g., in the form of a percentage as noted above) to a second (e.g., 'hydraulic enable') proportional valve.

In some embodiments the work state itself may be determined 330 based for example and in part on input 325 from sensors 204, input 310 from the user interface 206, and the like, and in some embodiments further based on feedback signals and/or data 360 relating to detected results from the applied hydraulic pressure for a given work state and/or load. The work state may be determined 330 based on a combination of such inputs as noted above, for example based on a first user command selecting a mode for automated on/off grapple squeeze functionality and at least a second user command specifying further operations of the work vehicle.

In an embodiment, ascertaining of the work state in a work vehicle 100 such as a forestry work vehicle 100 may be performed in some embodiments through direct implementation of vehicle sensors in a sensor system 204 including, e.g., a head pressure sensor to detect attachment load, a ground plane position sensor such as an inertial measurement unit (IMU) for estimating desired power while on the move, operator commands received via a joystick 208 button or equivalent input/output device for receiving operator commands 410 via the user interface 206, a saw position sensor in the work tool 48 such as the harvester head, etc. Where for example some of the aforementioned sensors are unavailable or otherwise preferably not implemented for a given application, work state identification may be provided using onboard machine learning algorithms. Data sets may be provided over time as training inputs to the machine learning model corresponding to time series data values for the component functions and operator commands corresponding to the type of work vehicle 100, wherein the model is further verified over time using test data inputs which may relate to the same or analogous sources.

For generation of the model, the time series data may for example be streamed from the respective sensors 204 and/or user interface 206 and/or controller 202 on the work vehicle 100 (alone or as one of a number of analogous work vehicles) via a communications network onto a cloud server network, wherein the model is developed (i.e., trained and validated) at the cloud server level. Once the model has been sufficiently validated, it may be transmitted, for example via the communications network, and deployed by the controller 202 onboard a work vehicle 100 for subsequent work state estimation. The cloud server network may however continue to receive input time series data from the work vehicle 100 (or plurality of analogous work vehicles) for the purpose of further refining the model, wherein updated versions of the model may be transmitted to the work vehicle 100 periodically or on demand.

The controller 202 implementing a work state estimation model as disclosed herein may be configured to automatically distinguish various functions of the work vehicle and components thereof, each function having, e.g., a corresponding maximum power (pressure/flow) requirement based on past data and/or grapple specifications, and accordingly determining/retrieving a target grapple flow rate/pressure for the defined work state.

As used herein, the phrase "one or more of," when used with a list of items, means that different combinations of one or more of the items may be used and only one of each item in the list may be needed. For example, "one or more of" item A, item B, and item C may include, for example, without limitation, item A or item A and item B. This example also may include item A, item B, and item C, or item Band item C.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments.

What is claimed is:

1. A computer-implemented method of controlling a work tool coupled to a frame of a work vehicle and moveable relative thereto, wherein the work tool is configured in a first mode to apply an enclosing pressure on a load and in a second mode to release the enclosing pressure on the load, the method comprising:

determining and storing in data storage, for each of a plurality of work states, a respective hydraulic configuration setting relating to an enclosing pressure to be applied in association with the first mode relative to a maximum hydraulic capacity, wherein each of the plurality of work states is associated with one or more work vehicle functions;

determining at least one current work state of the work vehicle;

in association with user commands associated with the first mode, automatically selecting from data storage a configuration setting corresponding to the determined at least one current work state of the work vehicle; and generating a control signal to an actuator for controlling a hydraulic flow rate and thereby an amount of enclosing pressure applied by the work tool and upon the load, based at least in part on the selected configuration setting.

2. The method of claim 1, wherein the data storage comprises a plurality of selectable hydraulic configuration settings which are based at least in part on user input corresponding to respective work states.

3. The method of claim 2, wherein the plurality of selectable hydraulic configuration settings are automatically adjusted based on historical data correlating hydraulic flow rates and failure conditions for the respective work states.

4. The method of claim 1, wherein the at least one current work state of the work vehicle is determined based at least in part on user commands and/or respective input signals from one or more onboard sensors.

5. The method of claim 1, wherein the at least one current state of the work vehicle is determined based on a first user command selecting the first mode and at least a second user command specifying further operations of the work vehicle.

6. The method of claim 4, wherein the input signals from at least one of the one or more onboard sensors are representative of one or more work vehicle functions comprising:

a raising/lowering movement of a boom assembly coupled to the work tool;

a swinging movement of the boom assembly coupled to the work tool;

a swinging movement of the work vehicle;

a delimber function;

an enclosing pressure applied by the work tool; and a saw function.

7. The method of claim 4, wherein the user commands are received via at least one of the one or more onboard sensors.

8. The method of claim 4, wherein the user commands are received via a user interface associated with an onboard computing device.

9. The method of claim 1, wherein a baseline maximum hydraulic flow rate is predetermined, and wherein the control signal is generated for controlling a hydraulic flow rate and thereby an amount of enclosing pressure applied by the work tool and upon the load, based on the selected hydraulic configuration setting as a proportion of the baseline maximum hydraulic flow rate.

10. The method of claim 1, wherein a baseline maximum hydraulic flow rate is set according to user manipulation of an interface tool during the first mode, and wherein the control signal is generated for controlling a hydraulic flow rate and thereby an amount of enclosing pressure applied by the work tool and upon the load, based on the selected hydraulic configuration setting as a proportion of the baseline maximum hydraulic flow rate.

11. A work vehicle comprising:

a frame;

a work tool coupled to the frame and moveable relative thereto, wherein the work tool is configured in a first mode to apply an enclosing pressure on a load and in a second mode to release the enclosing pressure on the load;

data storage having stored thereon, for each of a plurality of work states, a respective hydraulic configuration setting relating to an enclosing pressure to be applied in association with the first mode relative to a maximum hydraulic capacity, wherein each of the plurality of work states is associated with one or more work vehicle functions;

an onboard user interface configured to receive user input corresponding to respective user commands; and a controller configured to determine at least one current work state of the work vehicle, in association with user commands associated with the first mode, automatically select from data storage a configuration setting corresponding to the determined at least one current work state of the work vehicle, and generate a control signal to an actuator for controlling a hydraulic flow rate and thereby an amount of enclosing pressure applied by the work tool and upon the load, based on the selected configuration setting.

12. The work vehicle of claim 11, wherein the work tool comprises a grapple coupled to the frame via a boom assembly.

13. The work vehicle of claim 11, wherein the data storage comprises a plurality of selectable hydraulic configuration settings which are predetermined based on user input corresponding to respective work states.

14. The work vehicle of claim 11, wherein the plurality of selectable hydraulic configuration settings are automatically adjusted based on historical data correlating hydraulic flow rates and failure conditions for the respective work states.

15. The work vehicle of claim 11, wherein the at least one current work state of the work vehicle is determined based at least in part on user commands and/or respective input signals from one or more onboard sensors.

16. The work vehicle of claim 15, wherein the at least one current work state of the work vehicle is determined based on a first user command selecting the first mode and at least a second user command specifying further operations of the work vehicle, and wherein the user commands are received via at least one of the one or more onboard sensors and/or via a user interface functionally linked to the controller.

17. The work vehicle of claim 11, wherein a baseline maximum hydraulic flow rate is predetermined, and wherein the control signal is generated for controlling a hydraulic flow rate and thereby an amount of enclosing pressure applied by the work tool and upon the load, based on the selected hydraulic configuration setting as a proportion of the baseline maximum hydraulic flow rate.

18. The work vehicle of claim 11, wherein a baseline maximum hydraulic flow rate is set according to user manipulation of an interface tool during the first mode, and wherein the control signal is generated for controlling a hydraulic flow rate and thereby an amount of enclosing pressure applied by the work tool and upon the load, based on the selected hydraulic configuration setting as a proportion of the baseline maximum hydraulic flow rate.

* * * * *